(12) United States Patent
Su et al.

(10) Patent No.: US 12,206,083 B2
(45) Date of Patent: Jan. 21, 2025

(54) TEMPERATURE CONTROL COMPONENT AND BATTERY PACK

(71) Applicant: CONTEMPORARY AMPEREX TECHNOLOGY (HONG KONG) LIMITED, Hong Kong (CN)

(72) Inventors: Yongqiang Su, Ningde (CN); Zengzhong Wang, Ningde (CN); Buwei Wu, Ningde (CN); Linggang Zhou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1052 days.

(21) Appl. No.: 17/044,485

(22) PCT Filed: May 29, 2020

(86) PCT No.: PCT/CN2020/093512
§ 371 (c)(1),
(2) Date: Oct. 1, 2020

(87) PCT Pub. No.: WO2020/253507
PCT Pub. Date: Dec. 24, 2020

(65) Prior Publication Data
US 2023/0163381 A1    May 25, 2023

(30) Foreign Application Priority Data
Jun. 18, 2019 (CN) .......................... 201920919814.3

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/655* (2015.04);
(Continued)

(58) Field of Classification Search
CPC ............. H01M 10/613; H01M 10/647; H01M 10/6551; H01M 10/6555; H01M 10/6557; H01M 10/658; H01M 50/209; Y02E 60/10
See application file for complete search history.

(56) References Cited

U.S. PATENT DOCUMENTS

2011/0293982 A1* 12/2011 Martz ............... H01M 10/6557
429/120
2019/0312319 A1* 10/2019 Choi ................... H01M 10/652

FOREIGN PATENT DOCUMENTS

| CN | 1188889 A | 7/1998 |
|---|---|---|
| CN | 1783539 A | 6/2006 |

(Continued)

OTHER PUBLICATIONS

Extended European Search Report issued on Sep. 8, 2021, in connection with corresponding EP Application No. 20775798.0; 8 pages.
(Continued)

*Primary Examiner* — Lingwen R Zeng
(74) *Attorney, Agent, or Firm* — ANOVA LAW GROUP, PLLC

(57) ABSTRACT

The present application provides a temperature control component and a battery pack. The temperature control component includes a temperature control tube. The temperature control tube includes: a first side wall; a second side wall, forming a cavity together with the first side wall. At least part of an outer surface of the first side wall is formed into a curved surface concave toward the second side wall;
(Continued)

and/or, at least part of an outer surface of the second side wall is formed into a curved concave surface toward the first side wall surface.

20 Claims, 3 Drawing Sheets

(51) Int. Cl.
*H01M 10/655* (2014.01)
*H01M 10/6551* (2014.01)
*H01M 10/6555* (2014.01)
*H01M 10/658* (2014.01)
*H01M 50/209* (2021.01)
*H01M 10/647* (2014.01)

(52) U.S. Cl.
CPC ..... *H01M 10/6555* (2015.04); *H01M 10/658* (2015.04); *H01M 50/209* (2021.01); *H01M 10/647* (2015.04); *Y02E 60/10* (2013.01)

(56) References Cited

FOREIGN PATENT DOCUMENTS

| | | |
|---|---|---|
| CN | 1826503 A | 8/2006 |
| CN | 102576834 A | 7/2012 |
| CN | 105390647 A | 3/2016 |
| CN | 210136909 U | 3/2020 |
| DE | 10238235 A1 | 3/2004 |
| JP | H07190661 A | 7/1995 |
| JP | 2000048867 A | 2/2000 |
| JP | 2015011919 A | 1/2015 |
| JP | 2016152203 A | 8/2016 |
| JP | 2018081790 A | 5/2018 |
| KR | 20190012998 A | 2/2019 |
| WO | 2019027150 A1 | 2/2019 |

OTHER PUBLICATIONS

International Search Report issued on Aug. 31, 2020 in corresponding International application No. PCT CN2020/093512; 4 pages.
The China National Intellectual Property Administration (CNIPA) Notice of Grant of Utility Model Patent Rights for CN Application No. 201920919814.3, Jan. 14, 2020 2 Pages (Including English translation).
The European Patent Office (EPO) Decision to grant a European patent pursuant to Article 97(1)EPC for EP Application No. 20775798.0 Jan. 19, 2023 2 Pages.
Japan Patent Office (JPO) The Notice of Reasons for refusal For JP Application No. 2021-568932 Jan. 17, 2023 12 Pages (Translation Included).
Japan Patent Office (JPO) Decision of Refusal for JP Application No. 2021-568932 Jun. 20, 2023 8 Pages (Translation Included).
Indian Patent Office First Examination Report for Application No. 202127044240 Mar. 10, 2022 5 pages.
Indian Patent Office Decision to Grant a Patent for Application No. 202127044240 Dec. 26, 2023 1 page.
The Japan Patent Office (JPO) Decision to Grant a Patent for Application No. 2021-568932 Nov. 28, 2023 5 Pages (including translation).
Korean Intellectual Property Office (KIPO) Request for the Submission of an Opinion for 10-2021-7035970 Jan. 1, 2024 13 Pages (including translation).

* cited by examiner

TEMPERATURE CONTROL COMPONENT AND BATTERY PACK

CROSS-REFERENCE TO RELATED APPLICATIONS

The present application is a national stage of International Application No. PCT/CN2020/093512, filed on May 29, 2020, which claims priority to Chinese Patent Application No. 201920919814.3, filed with the Chinese Patent Office on Jun. 18, 2019, and entitled "TEMPERATURE CONTROL COMPONENT AND BATTERY PACK", the content of the present application which is hereby incorporated by reference in its entirety.

TECHNICAL FIELD

The present application relates to the field of battery technology and, in particular, to a temperature control component and a battery pack.

BACKGROUND

A battery pack usually includes a plurality of batteries grouped together. In a group technology, besides ensurance on strength and performance of a structure itself, influences of the structure on battery life also need to be considered, where temperature and expansion force have a great influence on the battery life, so thermal management and expansion force design must be considered during designing.

SUMMARY

In view of the problems in the Background, an objective of the present application is to provide a temperature control component and a battery pack. When the temperature control component is applied to the battery pack, the temperature control component would effectively reduce a force of the temperature control component on a surface of a battery while meeting a thermal management requirement for the battery, thereby greatly improving service life of the battery.

In order to achieve the above objective, the present application provides a temperature control component, which includes a temperature control tube. The temperature control tube includes: a first side wall; a second side wall, disposed opposite to the first side wall in a longitudinal direction, and the second side wall is connected to the first side wall and forms a cavity together with the first side wall. At least part of an outer surface of the first side wall is formed into a curved surface concave toward the second side wall in the longitudinal direction; and/or at least part of an outer surface of the second side wall is formed into a curved surface concave toward the first side wall in the longitudinal direction.

The temperature control tube further includes: a partition wall, extending in the longitudinal direction and connected to the first side wall and the second side wall to divide the cavity into a plurality of channels.

The first side wall includes: a first main body portion, formed into a curved surface concave toward the second side wall in the longitudinal direction; and a first extension portion, connected to one end of the first main body portion and extending in an up-down direction. The second side wall includes: a second main body portion, formed into a curved surface concave toward the first side wall in the longitudinal direction; and a second extension portion, connected to one end of the second main body portion and extending in the up-down direction, and the second extension portion is disposed opposite to the first extension portion in the longitudinal direction.

The temperature control component further includes: a first insulating member sleeved outside of the first extension portion and the second extension portion.

The first insulating member includes: a first body portion; and a first opening groove, disposed on the first body portion, a groove depth direction of the first opening groove is disposed in the up-down direction, and the first opening groove is provided for insertion of the first extension portion and the second extension portion.

The first body portion includes: a first upper wall, located on one side of the first extension portion and the second extension portion in the up-down direction; and two first clamping walls, clamping the first extension portion and the second extension portion in the longitudinal direction, each first clamping wall is connected to the first upper wall and extends in the up-down direction, and a thickness of each first clamping wall gradually decreases in the up-down direction from the first upper wall to a direction away from the first upper wall.

The first side wall further includes: a third extension portion, connected to the other end of the first main body portion and extending in the up-down direction. The second side wall further includes: a fourth extension portion, connected to the other end of the second main body portion and extending in the up-down direction, and the fourth extension portion is disposed opposite to the third extension portion in the longitudinal direction. The temperature control component further includes: a second insulating member, sleeved outside of the third extension portion and the fourth extension portion.

The second insulating member includes: a second body portion; and a second opening groove, disposed on the second body portion, a groove depth direction of the second opening groove is disposed in the up-down direction, and the second opening groove is provided for insertion of the third extension portion and the fourth extension portion.

The second body portion includes: a second upper wall, located on one side of the third extending portion and the fourth extension portion in the up-down direction; and two second clamping walls, clamping the third extension portion and the fourth extension portion in the longitudinal direction, each second clamping wall is connected to the second upper wall and extends in the up-down direction, and a thickness of each second clamping wall gradually decreases in the up-down direction from the second upper wall to a direction away from the second upper wall.

The present application also provides a battery pack, which includes a plurality of batteries and the temperature control component described above, the plurality of batteries include a first battery and a second battery, and the temperature control component is disposed between the first battery and the second battery.

DETAILED DESCRIPTION OF EMBODIMENTS

Figure 1:
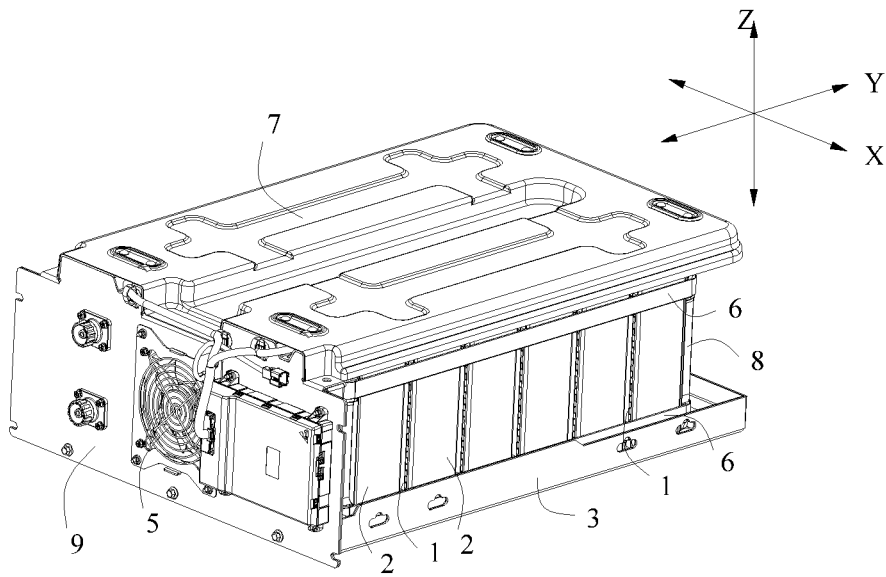
FIG. 1 is a perspective view of a battery pack according to the present application.

In order to make the objective, technical solutions and advantages of the present application more clearly, the present application will be described in further detail in the following in conjunction with the accompanying drawings and embodiments. It should be understood that specific embodiments described herein are only used to explain the present application, but not used to limit the present application.

In description of the present application, unless otherwise clearly specified and defined, the terms "first" and "second" are used only for the purpose of description but cannot be understood as indicating or implying relative importance; the term "a plurality of" refers to two or more than two (including two); unless otherwise specified or stated, the term "connection" should be understood in a broad sense, for example, the "connection" may be a fixed connection, a detachable connection, or an integral connection, or an electrical connection, or a signal connection; the "connection" can be a direct connection or an indirect connection through an intermediate medium. For those of ordinary skill in the art, specific meanings of the above terms in the present application can be understood according to specific situations.

In description of this specification, it should be understood that location words such as "up", "down" and others described in the embodiments of the present application are described from the perspective shown in the accompanying drawings, and should not be interpreted as a limitation to the embodiments of the present application. The present application will be described in further detail below through specific embodiments and in combination with the accompanying drawings.

In terms of the thermal management design: at present, there are mainly two modes of water-cooling and air-cooling. Due to high costs of the water-cooling mode, the battery pack generally adopts the air-cooling mode for heat dissipation.

In terms of the expansion force design: during charging and discharging processes of the battery pack, the batteries will gradually expand and generate interaction forces (that is, expansion forces) with a fixed structure. Appropriate expansion forces will be beneficial to the batteries' own reactions, but excessive expansion forces will cause a lithium precipitation phenomenon due to too much pressure on the batteries, and even produce an irreversible capacity loss, thereby greatly reducing the battery life.

In order to alleviate the expansion forces, currently, there are mainly the following several manners: (1) the batteries are directly attached to each other closely, and an external structure is strengthened to directly resist the expansion forces, while disadvantages of this mode are: the expansion forces of the grouped batteries will become larger and larger when battery capacity and the number of strings of battery groups gradually increase, thereby reducing service life of the batteries; (2) a structure such as a buffer pad is added between the batteries, and absorbs the expansion forces through its material's own expansion and contraction characteristics, thereby reducing the expansion forces after the grouping, while disadvantages of this mode are: large surfaces of the batteries are closely attached to the buffer pad, and only sides and bottoms of the batteries can be used for heat dissipation, thereby reducing heat dissipation efficiency; (3) one battery is separated from another battery and there is a gap in the middle so that the batteries expand freely, while disadvantages of this mode are: the batteries initially in free expansion, and an insufficient reaction easily occurs under no pressure, the service life is reduced, and meanwhile, if the expansion of the batteries is large and reserved gaps are too large, group volume will be affected.

With reference to FIG. 1 to FIG. 5, a battery pack of the present application includes a temperature control component 1, a plurality of batteries 2, a lower box 3, an air duct component 4, a fan 5, a cable tie 6, an upper box cover 7, an end plate 8, an installation panel 9 and a wire harness isolation plate (not shown).

Figure 2:
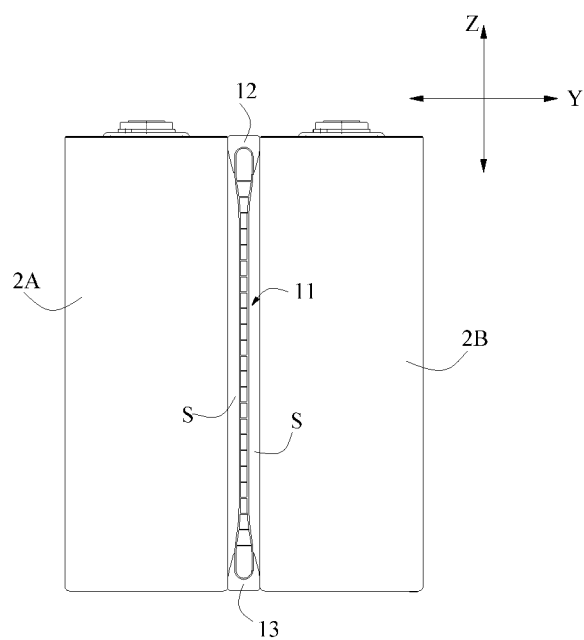
FIG. 2 is a schematic view of a positional relationship between two adjacent batteries and a corresponding temperature control component in FIG. 1.

With reference to FIG. 1 and FIG. 2, the plurality of batteries 2 include a first battery 2A and a second battery 2B, and the temperature control component 1 is disposed between the first battery 2A and the second battery 2B. Further, there may be a plurality of first batteries 2A and a plurality of second batteries 2B, the first batteries 2A and the second batteries 2B are sequentially arranged alternately, and the temperature control component 1 may be disposed between each adjacent first battery 2A and second battery 2B in a longitudinal direction Y.

Figure 3:
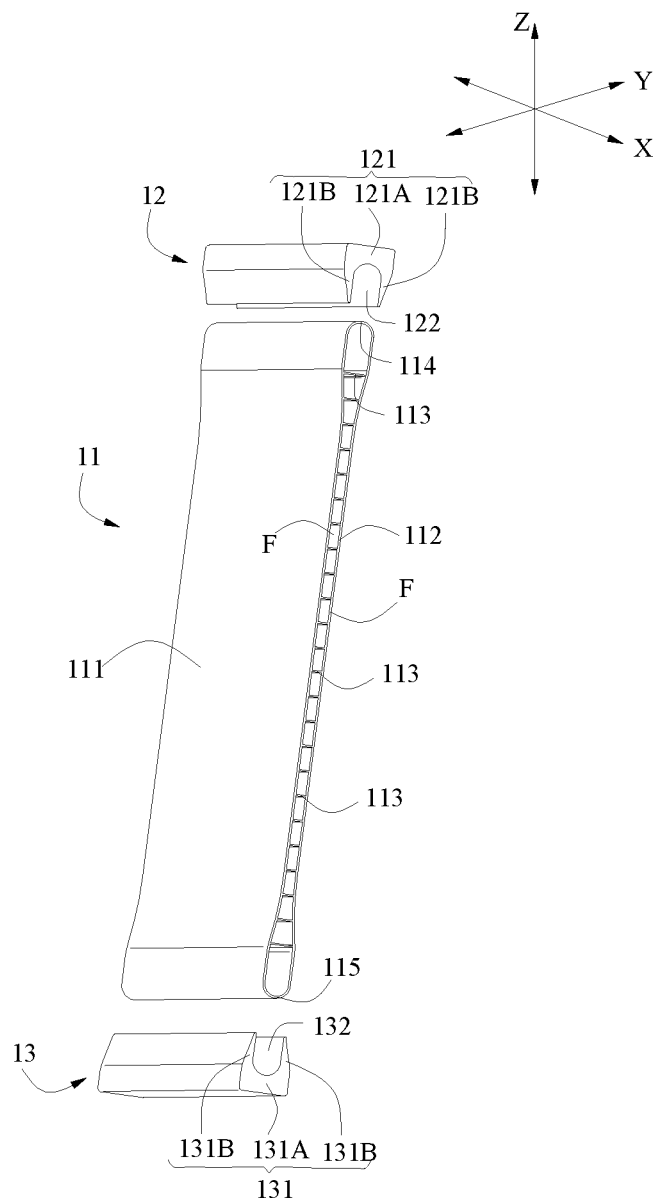
FIG. 3 is an exploded view of a temperature control component in FIG. 1.
Figure 4:
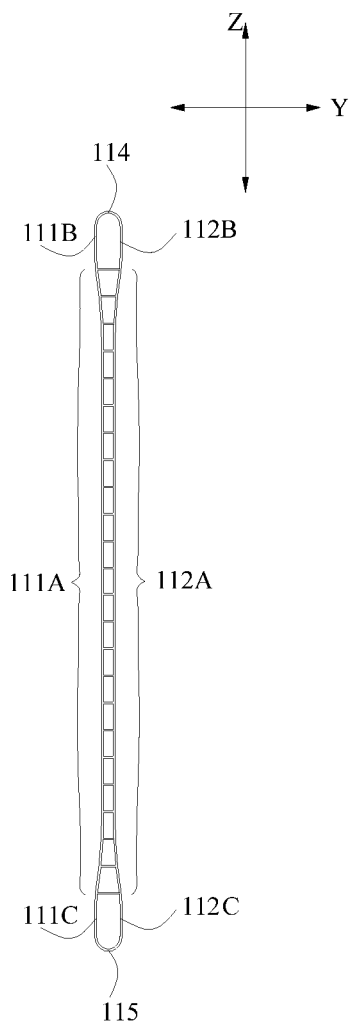
FIG. 4 is a front view of a temperature control tube in FIG. 3.

With reference to FIG. 2 to FIG. 4, the temperature control component 1 may include a temperature control tube 11, a first insulating member 12 and a second insulating member 13, where the first insulating member 12 and the second insulating member 13 are sleeved on two ends of the temperature control tube 11 in an up-down direction Z, respectively.

The temperature control tube 11 is used for heat dissipation treatment for the batteries 2, and in order to ensure strength and thermal conductivity of the temperature control tube 11, the temperature control tube 11 may be made of a metal material, such as an aluminum profile.

The temperature control tube 11 may include a first side wall 111, a second side wall 112, a partition wall 113, a first connection wall 114, and a second connection wall 115, where the first side wall 111, the second side wall 112, the partition wall 113, the first connection wall 114, and the second connection wall 115 may be integrally formed with an aluminum extrusion process.

The first side wall 111 and the second side wall 112 are oppositely disposed in the longitudinal direction Y, and the second side wall 112 is connected to the first side wall 111 through the first connection wall 114 and the second connection wall 115, and thereby the first side wall 111, the second side wall 112, the first connection wall 114, and the second connection wall 115 together form a surrounding frame structure with a cavity. The first side wall 111 and the second side wall 112 are directly facing large surfaces of corresponding batteries 2. When external air flows through the cavity of the temperature control tube 11, heat dissipation treatment for the batteries 2 could be realized to ensure the temperature control component 1 meets the thermal management requirement for the batteries 2.

At least part of an outer surface of the first side wall 111 is formed into a curved surface concaved toward the second side wall 112 in the longitudinal direction Y. After the temperature control component 1 and the batteries 2 are assembled, a gap S is formed between the first side wall 111 and a corresponding battery 2, and the gap S provides expansion space for expanding deformation of the battery 2.

During operation of the battery pack, when the battery 2 has an expanding deformation, the large surface of the battery 2 gradually bulges into the gap S and presses the outer surface of the first side wall 111, and since at least part of the outer surface of the first side wall 111 is formed into a curved surface, this curved surface structure would increase a contact area between the first side wall 111 and the large surface of the corresponding battery 2, and could fit with a shape of the large surface of the corresponding battery 2 bulging out, and thus a force of the temperature control tube 11 on the battery 2 would be effectively reduced, and service life of the battery 2 would be thereby greatly improved.

Specifically, with reference to FIG. 4, the first side wall 111 may include: a first main body portion 111A, formed into a curved surface concave toward the second side wall 112 in the longitudinal direction Y; a first extension portion 111B, connected to one end of the first main body portion 111A and extending in the up-down direction Z; and a third extension portion 111C, connected to the other end of the first main body portion 111A and extending in the up-down direction Z.

It should be noted that the first main body portion 111A corresponds to a middle position of the corresponding battery 2, and the first extension portion 111B and the third extension portion 111C correspond to two end positions of the corresponding battery 2 in the up-down direction Z. During the expansion of the battery 2, since the deformation of the battery 2 at both ends in the up-down direction Z is small and the deformation of the battery 2 at the middle is large, the first extension portion 111B and the third extension portion 111C corresponding to the upper and lower ends of the battery 2 may be directly formed into a planar structure.

At least part of an outer surface of the second side wall 112 is formed into a curved surface concaved toward the first side wall 111 in the longitudinal direction Y. After the temperature control component 1 and the batteries 2 are assembled, a gap S is formed between the second side wall 112 and a corresponding battery 2, and the gap S provides expansion space for an expanding deformation of the battery 2.

During operation of the battery pack, when the battery 2 has an expanding deformation, the large surface of the battery 2 gradually bulges into the gap S and presses the outer surface of the second side wall 112, and since at least part of the outer surface of the second side wall 112 is formed into a curved surface, this curved surface structure would increase a contact area between the second side wall 112 and the large surface of the corresponding battery 2 and could fit with a shape of the large surface of the corresponding battery 2 bulging out, and thus a force of the temperature control tube 11 on the battery 2 would be effectively reduced, and service life of the battery 2 would be thereby greatly improved.

Specifically, with reference to FIG. 4, the second side wall 112 may include: a second main body portion 112A, formed into a curved surface concave toward the first side wall 111 in the longitudinal direction Y; a second extension portion 112B, connected to one end of the second main body portion 112A and extending in the up-down direction Z, and disposed opposite to the first extension portion 111B in the longitudinal direction Y; and a fourth extension portion 112C, connected to the other end of the second main body portion 112A and extending in the up-down direction Z, and disposed opposite to the third extension portion 111C in the longitudinal direction Y.

It should be noted that the second main body portion 112A corresponds to a middle position of the corresponding battery 2, and the second extension portion 112B and the fourth extension portion 112C correspond to two end positions of the corresponding battery 2 in the up-down direction Z. During the expansion of the battery 2, since the deformation of the battery 2 at both ends in the up-down direction Z is small and the deformation of the battery 2 at the middle is large, the second extension portion 112B and the fourth extension portion 112C corresponding to the upper and lower ends of the battery 2 may be directly formed into a planar structure.

When at least part of the outer surface of the first side wall 111 is formed into a curved surface concave toward the second side wall 112 in the longitudinal direction Y, and at least part of the outer surface of the second side wall 112 is also formed into a curved surface concave toward the first side wall 111 in the longitudinal direction Y, a gap S is formed between the first side wall 111 and a corresponding battery 2, and between the second side wall 112 and a corresponding battery 2, respectively.

During operation of the battery pack, when the batteries 2 have expanding deformations, the large surfaces of two adjacent batteries 2 (that is, the first battery 2A and the second battery 2B) respectively bulge into corresponding gaps S and press the first side wall 111 and the second side wall 112. Since the curved surface structure of the first side wall 111 could fit with a shape of the large surface of the corresponding battery 2 bulging out, and the curved surface structure of the second side wall 112 could also fit with a shape of the large surface of the corresponding battery 2 bulging out, therefore the forces of the temperature control tube 11 on the batteries 2 would be effectively reduced, and the service life of the batteries 2 would be thereby greatly improved.

With reference to FIG. 2 to FIG. 4, the partition wall 113 extends in the longitudinal direction Y and is connected to the first side wall 111 and the second side wall 112 to divide the cavity into a plurality of channels F. Here, the arrangement of the partition wall 113 not only improves strength of the temperature control tube 11, but also ensures that the temperature control tube 11 has enough space for external air to circulate, so that the temperature control component 1 meets the thermal management requirement for the batteries 2.

With reference to FIG. 3 and FIG. 4, the first connection wall 114 is connected to an end of the first extension portion 111B away from the first main body portion 111A and an end of the second extension portion 112B away from the second main body portion 112A, and the first connection wall 114, the first extension portion 111B and the second extension portion 112B are accommodated in the first insulating member 12 together. The first connection wall 114 may be formed into a flat plate structure or a curved structure.

With reference to FIG. 3 and FIG. 4, the second connection wall 115 is connected to an end of the third extension portion 111C away from the first main body portion 111A and an end of the fourth extension portion 112C away from the second main body portion 112A, and the second connection wall 115, the third extension portion 111C and the fourth extension portion 112C are accommodated in the second insulating member 13 together. The second connection wall 115 may be formed into a flat plate structure or a curved structure.

With reference to FIG. 2 and FIG. 3, the first insulating member 12 is sleeved outside of the first extension portion 111B of the first side wall 111 and the second extension portion 112B of the second side wall 112, and is in direct contact with two adjacent batteries 2. Although the deformations of the batteries 2 at both ends in the up-down direction Z are small, in order to effectively reduce the forces of the temperature control component 1 on the batteries 2 and have an insulating effect, in some embodiments, the first insulating member 12 is made of an insulating buffer material.

Specifically, the first insulating member 12 may include: a first body portion 121; and a first opening groove 122, disposed on the first body portion 121, a groove depth direction of the first opening groove 122 is disposed in the up-down direction Z, and the first opening groove 122 is provided for insertion of the first extension portion 111B, the second extension portion 112B and the first connection wall 114.

The first body portion 121 may include: a first upper wall 121A, located on one side of the first extension portion 111B and the second extension portion 112B in the up-down direction Z; and two first clamping walls 121B, clamping the first extension portion 111B and the second extension portion 112B in the longitudinal direction Y, each first clamping wall 121B is connected to the first upper wall 121A and extends in the up-down direction Z, and a thickness of each first clamping wall 121B gradually decreases in the up-down direction Z from the first upper wall 121A to a direction away from the first upper wall 121A.

With reference to FIG. 2 and FIG. 3, the second insulating member 13 is sleeved outside of the third extension portion 111C of the first side wall 111 and the fourth extension portion 112C of the second side wall 112, and is in direct contact with the two adjacent batteries 2. Although the deformations of the batteries 2 at both ends in the up-down direction Z are small, in order to effectively reduce the forces of the temperature control component 1 on the batteries 2 and have an insulating effect, in some embodiments, the second insulating member 13 is also made of an insulating buffer material.

Specifically, the second insulating member 13 may include: a second body portion 131; and a second opening groove 132, disposed on the second body portion 131, a groove depth direction of the second opening groove 132 is provided in the up-down direction Z, and the second opening groove 132 is provided for insertion of the third extension portion 111C, the fourth extension portion 112C and the second connection wall 115.

The second body portion 131 may include: a second upper wall 131A, located on one side of the third extension portion 111C and the fourth extension portion 112C in the up-down direction Z; and two second clamping walls 131B, clamping the first extension portion 111C and the fourth extension portion 112C in the longitudinal direction Y, each second clamping wall 131B is connected to the second upper wall 131A and extends in the up-down direction Z, and a thickness of each second clamping wall 131B gradually decreases in the up-down direction Z from the second upper wall 131A to a direction away from the second upper wall 131A.

With reference to FIG. 1, the lower box 3 is used to support the plurality of batteries 2. The plurality of batteries 2 may be arranged in at least two rows of battery banks in a lateral direction X, and the air duct component 4 is disposed between the two rows of battery banks and fixed to the lower box 3. An air duct is formed between the air duct component 4 and a corresponding battery bank, and the air duct is in communication with the plurality of channels F of the corresponding temperature control component 1 and the fan 5.

Figure 5:
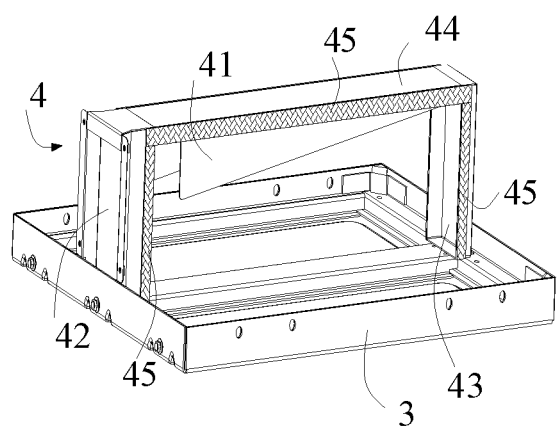
FIG. 5 is an assembly diagram of an air duct component and a lower box of a battery pack.

Specifically, with reference to FIG. 5, the air duct component 4 may include an air volume regulating plate 41, a first support plate 42, a second support plate 43, a mounting plate 44 and a sealing strip 45.

The air volume regulating plate 41 is disposed within the air duct, the first support plate 42 is spaced apart from the second support plate 43 in the longitudinal direction Y, and the first support plate 42 is close to the fan 5. A height of the air volume regulating plate 41 decreases sequentially in a direction from the first support plate 42 to the second support plate 43, so that the air duct expands, from a side close to the fan 5 to a side away from the fan 5 in the longitudinal direction Y.

The mounting plate 44 extends in the longitudinal direction Y and is connected to the first support plate 42 and the second support plate 43, and the air volume regulating plate 41 is fixedly mounted on the mounting plate 44. The sealing strip 45 is disposed on the first support plate 42, the second support plate 43 and the mounting plate 44. After the air duct component 4 is assembled with the plurality of batteries 2, the sealing strip 45 is adhered to a corresponding battery bank for a sealing connection with the battery bank.

During use of the battery pack, under action of the fan 5, external air can enter the plurality of channels F of the temperature control component 1 to achieve heat dissipation for the batteries 2. At the same time, based on arrangement of the air volume regulating plate 41, the amount of external air entering different temperature control components 1 is different, thereby achieving uniform heat dissipation for all the batteries 2.

With reference to FIG. 1, the end plate 8 is disposed at both ends of each battery bank in the longitudinal direction Y. The cable tie 6 tightly bundles, in the circumferential direction, all the batteries 2 in a corresponding battery bank, a corresponding temperature control component 1 and two corresponding end plates 8. The installation panel 9 is located outside of a corresponding end plate 8 in the longitudinal direction Y, is fixedly connected to the lower box 3 and the corresponding end plate 8, and is fixedly installed with the fan 5.

With reference to FIG. 1, the harness isolation plate is disposed above the plurality of batteries 2 and directly fixed to the end plate 8, which would help to improve grouping efficiency and an integration degree of the battery pack. The upper box cover 7 is disposed above the harness isolation plate and fixedly connected to the harness isolation plate through fasteners (such as rivets). Here, since the upper box cover 7 is provided with no buckle or other complicated structures on its peripheral side, the upper box cover 7 could be directly processed with a plastic absorption process, and thus process costs would be reduced.

The invention claimed is:

1. A temperature control component, comprising a temperature control tube, the temperature control tube comprising:
    a first side wall;
    a second side wall disposed opposite to the first side wall in a longitudinal direction, and the second side wall being connected to the first side wall and forming a cavity together with the first side wall;
    a first partition wall extending in the longitudinal direction and connected to a center of the first side wall and a center of the second side wall;
    a second partition wall extending in the longitudinal direction and connected to a first end of the first side wall and a first end of the second side wall, a length of the second partition wall in the longitudinal direction being greater than a length of the first partition wall in the longitudinal direction; and
    a third partition wall extending in the longitudinal direction and connected to a second end of the first side wall and a second end of the second side wall, the second end of the first side wall and the first end of the first side wall being two opposite ends of the first side wall, the second end of the second side wall and the first end of the second side wall being two opposite ends of the second side wall, a length of the third partition wall in the longitudinal direction being greater than the length of the first partition wall in the longitudinal direction; wherein:
- at least part of an outer surface of the first side wall is formed into a curved surface concave toward the second side wall in the longitudinal direction; and/or
- at least part of an outer surface of the second side wall is formed into a curved surface concave toward the first side wall in the longitudinal direction.

2. The temperature control component according to claim 1, wherein,
- the first side wall comprises: a first main body portion formed into a curved surface concave toward the second side wall in the longitudinal direction; and a first extension portion connected to one end of the first main body portion and extending in an up-down direction;
- the second side wall comprises: a second main body portion formed into a curved surface concave toward the first side wall in the longitudinal direction; and a second extension portion connected to one end of the second main body portion and extending in the up-down direction, and the second extension portion being disposed opposite to the first extension portion in the longitudinal direction.

3. The temperature control component according to claim 2, wherein the temperature control component further comprises: a first insulating member sleeved outside of the first extension portion and the second extension portion.

4. The temperature control component according to claim 3, wherein the first insulating member comprises: a first body portion; and a first opening groove disposed on the first body portion, a groove depth direction of the first opening groove is disposed in the up-down direction, and the first opening groove is provided for insertion of the first extension portion and the second extension portion.

5. The temperature control component according to claim 4, wherein the first body portion comprises: a first upper wall located on one side of the first extension portion and the second extension portion in the up-down direction; and two first clamping walls clamping the first extension portion and the second extension portion in the longitudinal direction, each of the two first clamping walls is connected to the first upper wall and extends in the up-down direction, and a thickness of each first clamping wall gradually decreases in the up-down direction from the first upper wall to a direction away from the first upper wall.

6. The temperature control component according to claim 2, wherein,
- the first side wall further comprises: a third extension portion connected to the other end of the first main body portion and extending in the up-down direction;
- the second side wall further comprises: a fourth extension portion connected to the other end of the second main body portion and extending in the up-down direction, and the fourth extension portion is disposed opposite to the third extension portion in the longitudinal direction;
- the temperature control component further comprises: a second insulating member, sleeved outside of the third extension portion and the fourth extension portion.

7. The temperature control component according to claim 6, wherein the second insulating member comprises: a second body portion; and a second opening groove disposed on the second body portion, a groove depth direction of the second opening groove is disposed in the up-down direction, and the second opening groove is provided for insertion of the third extension portion and the fourth extension portion.

8. The temperature control component according to claim 7, wherein the second body portion comprises: a second upper wall located on one side of the third extending portion and the fourth extension portion in the up-down direction; and two second clamping walls clamping the third extension portion and the fourth extension portion in the longitudinal direction, each of the two second clamping walls is connected to the second upper wall and extends in the up-down direction, and a thickness of each second clamping wall gradually decreases in the up-down direction from the second upper wall to a direction away from the second upper wall.

9. The temperature control component according to claim 1, wherein
- the first side wall comprises: a first main body portion formed into a curved surface concave toward the second side wall in the longitudinal direction; and a first extension portion connected to one end of the first main body portion and extending in an up-down direction;
- the second side wall comprises: a second main body portion formed into a curved surface concave toward the first side wall in the longitudinal direction; and a second extension portion connected to one end of the second main body portion and extending in the up-down direction, and the second extension portion being disposed opposite to the first extension portion in the longitudinal direction.

10. The temperature control component according to claim 3, wherein,
- the first side wall further comprises: a third extension portion connected to the other end of the first main body portion and extending in the up-down direction;
- the second side wall further comprises: a fourth extension portion connected to the other end of the second main body portion and extending in the up-down direction, and the fourth extension portion is disposed opposite to the third extension portion in the longitudinal direction;
- the temperature control component further comprises: a second insulating member sleeved outside of the third extension portion and the fourth extension portion.

11. The temperature control component according to claim 4, wherein,
- the first side wall further comprises: a third extension portion connected to the other end of the first main body portion and extending in the up-down direction;
- the second side wall further comprises: a fourth extension portion connected to the other end of the second main body portion and extending in the up-down direction, and the fourth extension portion is disposed opposite to the third extension portion in the longitudinal direction;
- the temperature control component further comprises: a second insulating member sleeved outside of the third extension portion and the fourth extension portion.

12. The temperature control component according to claim 5, wherein,
- the first side wall further comprises: a third extension portion connected to the other end of the first main body portion and extending in the up-down direction;
- the second side wall further comprises: a fourth extension portion connected to the other end of the second main body portion and extending in the up-down direction, and the fourth extension portion is disposed opposite to the third extension portion in the longitudinal direction; the temperature control component further comprises: a second insulating member, sleeved outside of the third extension portion and the fourth extension portion.

13. The temperature control component according to claim 9, wherein the temperature control component further comprises: a first insulating member sleeved outside of the first extension portion and the second extension portion.

14. The temperature control component according to claim 13, wherein the first insulating member comprises: a first body portion; and a first opening groove disposed on the first body portion, a groove depth direction of the first opening groove is disposed in the up-down direction, and the first opening groove is provided for insertion of the first extension portion and the second extension portion.

15. The temperature control component according to claim 14, wherein the first body portion comprises: a first upper wall located on one side of the first extension portion and the second extension portion in the up-down direction; and two first clamping walls clamping the first extension portion and the second extension portion in the longitudinal direction, each of the two first clamping walls is connected to the first upper wall and extends in the up-down direction, and a thickness of each first clamping wall gradually decreases in the up-down direction from the first upper wall to a direction away from the first upper wall.

16. The temperature control component according to claim 12, wherein the second insulating member comprises: a second body portion; and a second opening groove disposed on the second body portion, a groove depth direction of the second opening groove is disposed in the up-down direction, and the second opening groove is provided for insertion of the third extension portion and the fourth extension portion.

17. The temperature control component according to claim 16, wherein the second body portion comprises: a second upper wall located on one side of the third extending portion and the fourth extension portion in the up-down direction; and two second clamping walls clamping the third extension portion and the fourth extension portion in the longitudinal direction, each of the two second clamping walls is connected to the second upper wall and extends in the up-down direction, and a thickness of each second clamping wall gradually decreases in the up-down direction from the second upper wall to a direction away from the second upper wall.

18. The temperature control component according to claim 11, wherein the second insulating member comprises: a second body portion; and a second opening groove disposed on the second body portion, a groove depth direction of the second opening groove is disposed in the up-down direction, and the second opening groove is provided for insertion of the third extension portion and the fourth extension portion.

19. A battery pack, comprising a plurality of batteries and the temperature control component according to claim 1, the plurality of batteries comprising a first battery and a second battery, and the temperature control component being disposed between the first battery and the second battery.

20. The temperature control component according to claim 1, wherein the temperature control tube further comprises:
a first connection wall connected to the first end of the first side wall and the first end of the second side wall; and
a second connection wall connected to the second end of the first side wall and the second end of the second side wall, at least one of the first connection wall or the second connection wall being formed in a curved structure, and the curved structure comprising an arch convex away from the first partition wall.

* * * * *